United States Patent [19]
Nakai

[11] Patent Number: 6,074,681
[45] Date of Patent: Jun. 13, 2000

[54] METHOD OF DRYING KONJAK IN PRODUCING DRIED SEASONED KONJAK

[75] Inventor: Nobuyuki Nakai, Ishikawa-ken, Japan

[73] Assignee: Sun Foods Co., Ltd., Ishikawa, Japan

[21] Appl. No.: 09/244,851

[22] Filed: Feb. 4, 1999

[30] Foreign Application Priority Data

Feb. 6, 1998 [JP] Japan .................................. 10-041134

[51] Int. Cl.[7] ..................................................... A23L 3/00
[52] U.S. Cl. ........................... 426/242; 426/465; 426/573; 426/578
[58] Field of Search ..................... 426/573, 578, 426/242, 465

[56] References Cited

U.S. PATENT DOCUMENTS

| | | | |
|---|---|---|---|
| 4,963,383 | 10/1990 | Nozaki et al. | 426/573 |
| 5,009,915 | 4/1991 | Ogawa | 426/615 |
| 5,019,412 | 5/1991 | Hattori | 426/242 |
| 5,173,321 | 12/1992 | Hosogoe et al. | 426/573 |
| 5,284,673 | 2/1994 | Nozaki et al. | 426/573 |
| 5,358,731 | 10/1994 | Sakamoto et al. | 426/574 |
| 5,665,418 | 9/1997 | Sono | 426/640 |
| 5,718,932 | 2/1998 | Nakao et al. | 426/104 |

FOREIGN PATENT DOCUMENTS

| | | |
|---|---|---|
| 59-48970 | 11/1984 | Japan . |
| 2-34587 | 8/1990 | Japan . |
| 08336362 | 12/1996 | Japan . |
| 2614192 | 2/1997 | Japan . |

*Primary Examiner*—Nina Bhat
*Attorney, Agent, or Firm*—King and Schickli, PLLC

[57] ABSTRACT

A method of drying konjak slices in producing seasoned dried konjak slices is provided which method allows for reducing the drying time while at the same time drying the konjak slices homogeneously to their deep interior. In manufacturing dried seasoned konjak by drying seasoned konjak to a moisture content of 10 to 30%, the method for drying is characterized by effecting the drying by carrying the seasoned konjak on a heat-resistant netting 1 in an enclosed space 1 and subjecting the seasoned konjak to heated air at a temperature equal to or higher than 60° C. with or without far-infrared radiation irradiation.

6 Claims, 1 Drawing Sheet

1

METHOD OF DRYING KONJAK IN PRODUCING DRIED SEASONED KONJAK

FIELD OF THE INVENTION

The present invention relates generally to a seasoned dried konjak (konnyaku), and more particularly to a method of drying konjak slices in producing a thin-plate like seasoned dried konjak slices. Konjak or konnyaku is Japanese paste food made from konjak flour or jelly-like food made from the starch of devil's tongue. Seasoned dried konjak is a seasoned and dried thin plate-like food which may be eaten with hand fingers as an 'otsumami' or tidbit taken with alcoholic drinks just like a snack.

THE PRIOR ART

The prior art drying methods heretofore proposed for use in the manufacture of dry seasoned konjak slices include the method comprising dehumidify-drying in a low-temperature drying chamber (as disclosed in Japanese Patent Application Publication No. 59-48970), the method comprising vaporizing water by low-temperature drying (as disclosed in Japanese Patent Application Publication No. 2-34587), and the method comprising drying an object while it is grasped from top and bottom between heated grasping members (as disclosed in Japanese Patent No. 2614192).

The conventional drying method involves either dehumidify-drying in a low-temperature space or grasping an object between heated platens, as noted above. The former has the drawback that it requires a long drying time while the latter has the problem that surfaces exposed to high temperature will be immediately dried. Both of the two methods have another problem that they are unable to dry an abject to its deep interior and to dry the object homogeneously throughout its entire body.

SUMMARY OF THE INVENTION

Accordingly, the present invention contemplates to provide a method of drying konjak slices in producing seasoned dried konjak slices which method allows for reducing the drying time while at the same time drying the konjak slice homogeneously to its deep interior.

In manufacturing dried seasoned konjak by drying seasoned konjak to a moisture content of 10 to 30%, the method for drying according to this invention is characterized by effecting the drying by carrying the seasoned konjak on a heat-resistant netting 4 in an enclosed space 1 and subjecting the seasoned konjak to heated air at a temperature equal to or higher than 60° C.

In lieu of or in combination with the heated air, the drying may be effected by irradiation of far-infrared radiation to the seasoned konjak. The heat-resistant netting may be made of fluoro-resin or treated on its surface with fluoro-resin.

In the present invention, the seasoned konjak is subjected to either heated air or far-infrared radiation in an enclosed space whereby the heat together with the surrounding temperature is applied directly to the konjak while at the same time there occur air flows, resulting in an enhanced drying effect.

Besides, as the konjak is carried on the heat-resistant netting, it is subjected to heating and evaporating effects from its entire peripheral surfaces including the surface of the konjak which is supported on the mesh conveyor.

Far-infrared radiation heats the konjak slice from the inside thereof to thereby promote the evaporation of water from the inside without allowing the moisture to remain in the inside to thereby provide for drying the interior of the konjak slice to an extent comparable to the extent that the surface of the konjak is dried.

In addition, the netting made of fluoro-resin or treated with fluoro-resin acts to prevent the konjak from adhering to the netting as it is dried.

DESCRIPTION OF THE PREFERRED EMBODIMENTS

An embodiment of the invention will be described with reference to the appended drawings.

Figure 1:
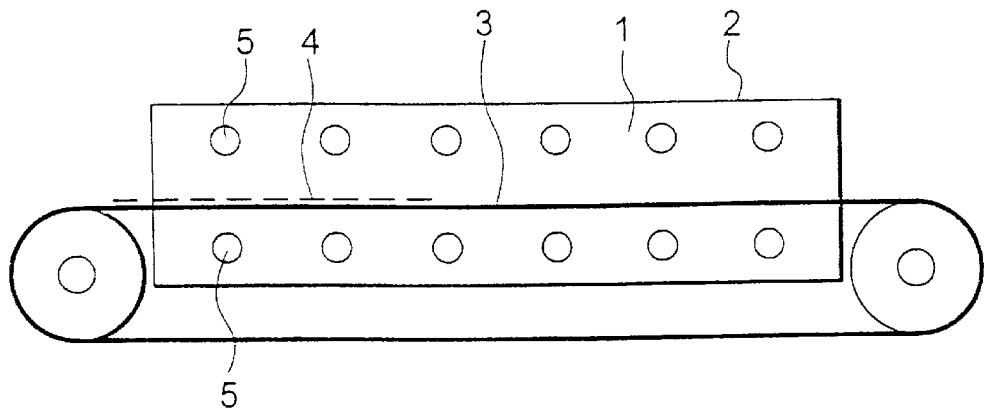
FIG. 1 is a diagramatical view illustrating an embodiment of the apparatus for practicing the method of this invention.

FIG. 1 is a diagramatical view illustrating an embodiment of an apparatus for practicing the method of this invention. The apparatus comprises a drying chamber 2 defining an enclosed space or compartment 1 therein in which there is disposed a moving mesh or netting conveyor 3 passing through the middle of the chamber.

The mesh conveyor 3 is made of heat-resistant metal or resin, preferably fluoro-resin such as Teflon (registered trademark) or Teflon-coated material.

While it is preferable that the mesh conveyor 3 have a larger mesh size, the mesh size is actually chosen depending on the size of the thin-plate like konjak slice 4 since the mesh conveyor 3 is required to adequately support the seasoned konjak thereon.

The drying chamber 2 is provided with a plurality of heated air jets or nozzles 5 appropriately located to direct heated air at the mesh conveyor 3. The heated air may be at a medium to high temperature equal to or higher than 60° C. and may be adjusted within a range up to 150° C.

In combination with the heated air, a dehumidifier or exhaust duct may be used as required to promote the evaporation of water.

According to the present invention, thin-plate like konjak slices 4 carried on the mesh conveyor 3 are directly subjected to heated air and have the water therein evaporated at the temperate of the drying chamber 2. It has been found that evaporation of water occurs from the entire peripheral surface of the konjak including the surface of the konjak which is supported on the mesh conveyor, thereby achieving the desired drying in only about 60 minutes.

Konjak may be sliced into pieces each of about 5 mm in thickness, 140 mm to 680 mm in length and 70 mm to 420 mm in width.

Figure 2:
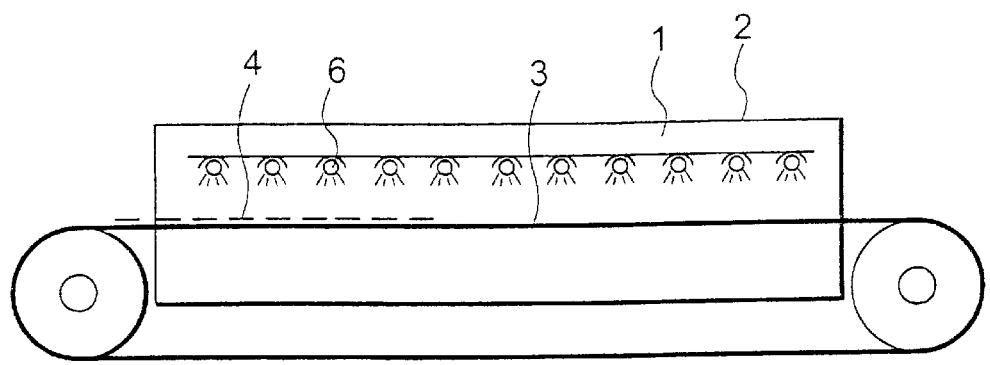
FIG. 2 is similar to FIG. 1 but illustrates an alternate embodiment of the apparatus for practicing the method of this invention.

FIG. 2 illustrates an alternate embodiment of the apparatus for practicing the method of this invention in which far-infrared radiation generators 6 in lieu of the heated air jets 5 in the first embodiment are provided to irradiate the thin-plate like konjak slices 4. Far-infrared radiation causes the konjak slice to generate heat from the inside thereof to thereby effect drying by evaporation of water from the inside toward the outside of the konjak slice.

In addition, the drying by far-infrared radiation does not involve driving off moisture as vapor, resulting in an enhanced efficiency in drying as there is little need for dehumidifying or exhausting vapor from the drying chamber.

Figure 3:
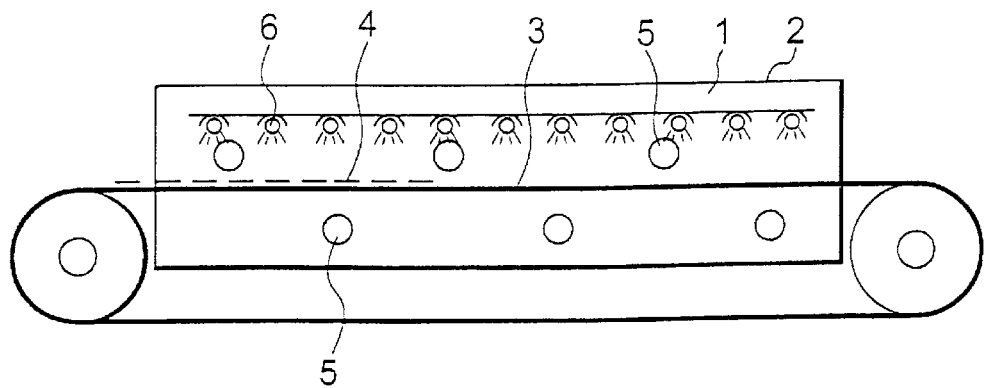
FIG. 3 is similar to FIGS. 1 and 2 but illustrates a still another embodiment of the apparatus for practicing the method of this invention.

FIG. 3 illustrates a still another embodiment of the apparatus for practicing the method of this invention in which the heated air jets or nozzles 5 and the far-infrared radiation generators 6 are used in combination.

EFFECTS OF THE INVENTION

It will be appreciated from the foregoing that the present invention carries out the drying by the use of heated air at a medium to high temperature to provide the effect of promoting the evaportaion-drying by flow of air as well as by heat to thereby provide for manufacturing thin-plate like dried seasoned konjak slices efficiently in a shortened time.

It is also to be understood that the embodiment utilizing far-infrared radiation is configured to promote evaporation of water from the inside of the konjak to allow for adequately drying the konjak to its deep interior to thereby provide uniformly dried konjak slices.

In addition, by drying konjak slices as carried on a heat-resistant mesh or netting the present invention provides for evaporating moisture uniformly from all over the entire surfaces of the konjak slice. The use of fluoro-resin for the heat-resistant mesh may prevent konjak from adhering to the mesh during the drying process.

What is claimed is:

1. A method for drying seasoned konjak slices to a moisture content of 10 to 30% in manufacturing dried ready-to-eat seasoned konjak, characterized by effecting the drying by carrying the seasoned konjak slices on a heat-resistant netting in an enclosed space and subjecting the seasoned konjak slices to heated air at a temperature in the range between 60° C. and substantially 150° C.

2. The method of claim 1 wherein the drying is effected by irradiation of far-infrared radiation to the seasoned konjak in lieu of heated air.

3. The method of claim 1 wherein the drying is effected by irradiation of far-infrared radiation to the seasoned konjak in combination with the use of heated air.

4. The method of claim 1 wherein said heat-resistant netting is made of fluoro-resin or treated on its surface with fluoro-resin.

5. The method of claim 2, wherein said heat-resistant netting is made of fluoro-resin or treated on its surface with fluoro-resin.

6. The method of claim 3, wherein set heat-resistant netting in made of fluoro-resin or treated on its surface with fluoro-resin.

* * * * *